Sept. 26, 1950     L. B. GRAY     2,523,426
MEASURING AND DISPENSING DEVICE
Filed Aug. 26, 1947
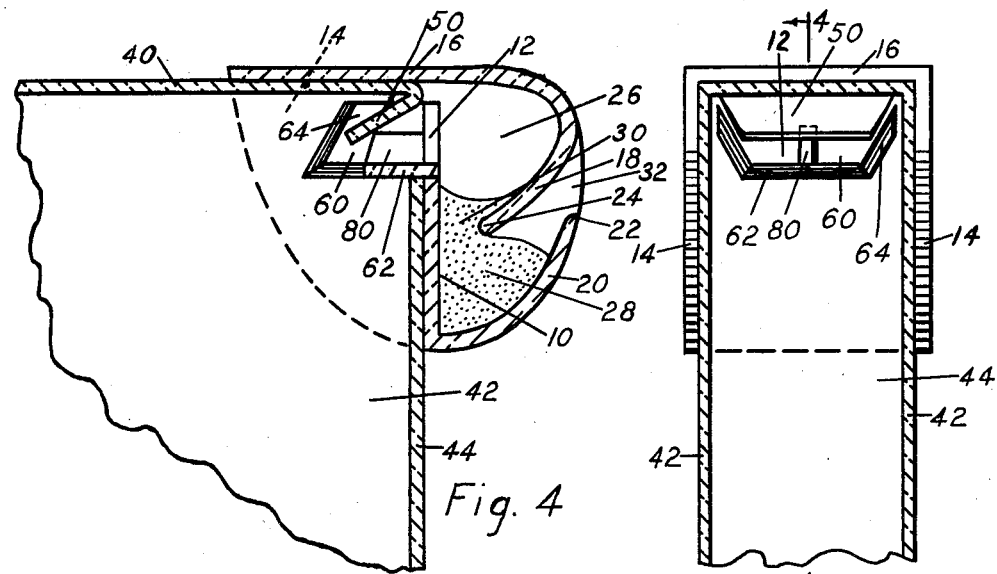
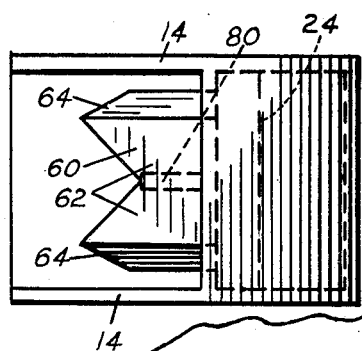
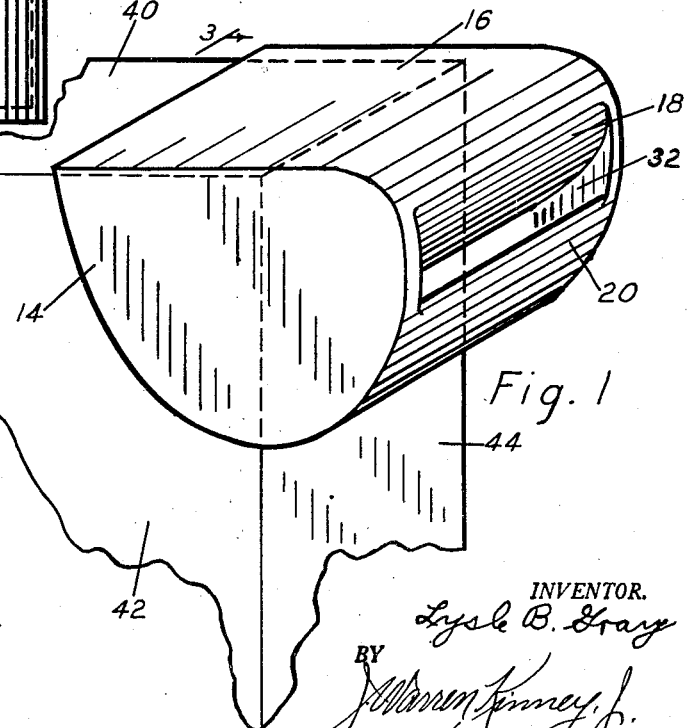
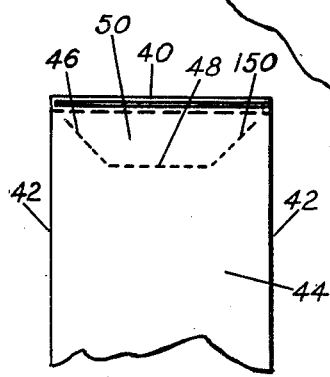
INVENTOR.
Lysle B. Gray
BY J. Warren Kinney Jr.
attorney Patented Sept. 26, 1950

2,523,426

UNITED STATES PATENT OFFICE 2,523,426

MEASURING AND DISPENSING DEVICE

Lysle B. Gray, Reading, Ohio

Application August 26, 1947, Serial No. 770,591

5 Claims. (Cl. 222—81)

This invention relates to measuring and dispensing devices, and more particularly to a measuring and dispensing device adapted for attachment to containers of pulverulent, granular, powdered or flake-like materials.

An object of the present invention is to provide a combination measuring and dispensing device for such materials and which device may be simply, easily and securely attached to the conventional container in which such materials are commercially sold.

Another object of the invention is to provide a measuring and dispensing device having operatively associated therewith means for affecting an opening thru the wall of the container, the contents of which it is desired to dispense in measured quantities.

A further object of the invention is to provide dispensing and measuring device adapted for attachment to a container, which device includes means for precluding accidental or unintentional closing of the dispensing flap of the container with which it is associated.

Still another object of the invention is to provide a measuring and dispensing device having the hereinabove described characteristics and which includes means for securely, though releasably attaching it to a container.

Another object of the invention is to provide a measuring and dispensing device for attachment to a container wherein said device is provided with means for establishing a spill-proof connection with the interior of said container and thru which the contents thereof may be discharged into said device.

Still a further object of the invention is to provide a measuring and dispensing device wherein the contents of the container to which it is attached are effectively sealed during periods of non-use.

Another object of the invention is to provide a measuring and dispensing device having the hereinabove described characteristics which is inexpensive, light in weight and lends itself nicely to modern mass production manufacturing techniques.

These and other objects are attained by the means described herein and as disclosed in the accompanying drawings, in which:

Fig. 1 is a perspective view of the dispensing and measuring device of the present invention secured to a carton, only the upper right portion of which is illustrated.

Fig. 2 is a bottom plan view of my measuring and dispensing device illustrating certain structural details.

Fig. 3 is a vertical section taken on line 3—3 of Fig. 1.

Fig. 4 is a vertical section taken on line 4—4 of Fig. 3.

Fig. 5 is a partial end view of a typical carton for granular, powdered, pulverulent, chip, and flake-like materials of the type which may be measured and dispensed with my device.

With reference now to Fig. 4, it will be noted that my device comprises a wall 10 having a discharge aperture 12 provided therein, and having a pair of laterally spaced side walls 14 secured to the ends of wall 10 and extending forwardly and rearwardly on opposite sides thereof. A top wall 16 spans the upper edges of side walls 14, said wall being extended forwardly, thence downwardly and rearwardly toward wall 10 for providing an overhanging front wall portion 18. The lower end of wall 10 may be turned upwardly and outwardly for providing a lower front wall portion 20, the upper end 22 of which terminates in a plane above end 24 of the upper front wall portion 18.

The relationship between wall 10 and the upper and lower portions 18 and 20 of front wall is such as to form a measuring chamber 26 and a storage or dispensing chamber 28. Material to be measured and dispensed will initially flow into measuring chamber 26 by way of aperture 12 during those periods of time when the container to which the device is attached has been turned about 90 degrees in a clockwise direction from the position illustrated in Figs. 1 and 4. When the container is returned to an upright position the measured quantity in chamber 26 will flow into the storage or dispensing chamber 28 thru passageway 30 which is defined by lower edge 24 of upper wall portion 18 and wall 10. The material thus deposited in the storage or discharge chamber will be discharged thru discharge opening 32 the next time the container is turned 90 degrees in a clockwise direction. A new charge of material will flow into the measuring chamber concurrently with the flow of material from the storage or dispensing chamber. As illustrated in Fig. 4, discharge opening 32 may be provided between upper end 22 of lower front wall portion 20 and the underside of the upper portion 18 of front wall. It will be noted that the upper end 22 of the lower front wall is located above lower edge 24 of upper portion 18 of the front wall which defines the intake port of the storage chamber. This construction provides effective means for sealing the contents of the container during periods of storage since the measured charge of chamber 26 will completely seal passageway 30 between chambers 26 and 28, as illustrated in Fig. 4.

Those portions of side walls 14 which extend rearwardly from wall 10 cooperate with said wall and the undersurface of top wall 16 to receive and frictionally engage the top, side and end corner-forming panels 40, 42 and 44, respectively, of a container in which material, such as soap powder, flakes, chips and the like are customarily sold.

With reference to Fig. 5, it will be noted that end panel 44 may be provided with score lines 46, 48 and 150 for defining a flap portion 50 which is adapted to be folded rearwardly into the carton for establishing a port in the end panel through which the contents of the container may be discharged.

As indicated in Figs. 2, 3 and 4, piercing means denoted generally by the numeral 60 are secured to and project rearwardly from the perimeter of discharge aperture 12. Said piercing means may include a horizontal portion 62 and inclined portion 64 which are adapted to engage score lines 46, 48 and 150 of end panel 44, see Fig. 5.

In the preferred embodiment of the invention, the upper ends of inclined walls 64 terminate short of and are spaced from the underside of top wall 16 and the inner faces of side walls 14 by a dimension greater than the wall thickness of the adjacent intersecting top, side and edge panels 40, 42 and 44 of a carton.

The rearmost edges of the piercing means are tapered whereby to present cutting or rupturing edges which, in the case of a carton such as illustrated in Fig. 5, would be operable for severing flap 50 along edges 46, 48 and 150. However, it should be understood that I propose to provide cutting edges capable of establishing a flap in the end wall of those containers in which such a flap has not been provided in scored outline, as in Fig. 5.

Preferably, though not necessarily, I provide an interfering member 80 in the form of an upstanding lug disposed at substantial right angles with horizontal portion 62 of piercing means 60. As illustrated in Fig. 4, said interfering member is adapted to engage flap 50 in such a manner as to hold it in open position against accidental or unintentional closing movement which would interrupt or impede the flow of material outwardly thru the port defined by said flap.

As clearly illustrated in Figs. 3 and 4, elements 62 and 64 of piercing means 60 extend forwardly into the interior of the container in such a manner as to effect a spill-proof connection therewith in the form of a discharge channel through which the contents of the container may flow en route to aperture 12 and measuring chamber 26.

If desired, my device may be fabricated from plastic, or from sheet metal or from any other suitable substance having the desired characteristics.

What is claimed is:

1. A device of the class described comprising a wall having an aperture therethrough, a pair of laterally spaced side walls secured to the ends of said wall and extending on opposite sides thereof, a top wall spanning the upper edges of said side walls, said side, top and first mentioned wall proportioned to receive and frictionally engage the top, side and end corner-forming panels of a container, and piercing means comprising a central portion disposed in spaced parallelism with said top wall and a pair of side portions extending outwardly and upwardly from said central portion, the upper ends of which side portions terminate adjacent but spaced from the intersections defined by said top and side walls, said central and side portions projecting rearwardly from said first mentioned wall and beneath said top wall for providing a conduit in communication with the aperture in said wall.

2. A device of the class described comprising a wall having an aperture therethrough, a pair of laterally spaced side walls secured to the ends of said wall and extending on opposite sides thereof, a top wall spanning the upper edges of said side walls, said side, top and first mentioned wall proportioned to receive and frictionally engage the top, side and end corner-forming panels of a container, and piercing means comprising a central portion disposed in spaced parallelism with said top wall and a pair of side portions extending outwardly and upwardly from said central portion, the upper ends of which side portions terminate adjacent but spaced from the intersections defined by said top and side walls, said central and side portions projecting rearwardly from said first mentioned wall and beneath said top wall for providing a conduit in communication with the aperture in said wall, and wherein said central and side portions terminate in cutting edges to facilitate the introduction of said conduit through the wall of a container and thence into the interior thereof.

3. A device of the class described comprising a wall having an aperture therein in open communication with the upper edge thereof, a pair of laterally spaced side walls extending forwardly from said wall, a top wall spanning said side walls engaging the upper edge of said first wall and extending rearwardly therefrom, a substantially U-shaped conduit projecting rearwardly from said first wall and in open communication with the aperture therein, the upper edges of said conduit being disposed in spaced relationship with the underside of said top wall, the rear edges of said conduit constructed and arranged to pierce thru the wall of a container for defining and providing a conduit receptacle opening therein, the edges of which frictionally engage corresponding portions of said conduit for securing said device to a container.

4. A device of the class described comprising a chamber having a rear wall, an upwardly inclined bottom wall, a pair of laterally spaced side walls, a top wall the forward portion of which is turned downwardly and thence rearwardly to provide a partition within the chamber in spaced relationship with said bottom wall for providing an upper measuring and a lower dispensing compartment in said chamber, the inner end of said partition spaced from said rear wall for providing a passageway between said compartments, the forward edge of said bottom wall spaced from said partition for providing a passageway for said dispensing compartment, the rear wall of said measuring compartment having an aperture provided therethrough, a substantially U-shaped conduit secured to and projecting rearwardly from said rear wall in open communication with the aperture therein, the rear edges of the bottom and side walls of said conduit constructed and arranged to define and establish an opening in and through the wall of a package with which the device is used and into which said conduit projects for establishing a leak proof passageway between the interior of a package and the measuring compartment of said device, the top wall of said chamber extending rearwardly of the rear wall of said compartment and in spaced relationship with the upper edges of the side walls of said conduit for engaging the outer face of the top panel of a package with which the device has been associated.

5. A device of the class described comprising a chamber having a rear wall, an upwardly inclined bottom wall, a pair of laterally spaced side walls, a top wall, the forward portion of which is turned downwardly and thence rearwardly to provide a partition within the chamber in spaced relationship with said bottom wall for providing an upper measuring and a lower dispensing compartment in said chamber, the inner end of said partition spaced from said rear wall for providing a passageway between said compartments, the forward edge of said bottom wall spaced from said partition for providing a passageway for said dispensing compartment, the rear wall of said measuring compartment having an aperture provided therethrough, a substantially U-shaped conduit secured to and projecting rearwardly from said rear wall in open communication with the aperture therein, the rear edges of the bottom and side walls of said conduit constructed and arranged to define a flap and establish an opening in and through the wall of a package with which the device is used and into which said conduit projects for establishing a leakproof passageway between the interior of a package and the measuring compartment of said device, an interferring member provided centrally of said conduit projecting upwardly from the bottom wall thereof to engage the flap provided in the wall of a package for maintaining said flap in a non-obstructing relationship with said conduit, the top wall of said chamber extending rearwardly of the rear wall of said compartment and in spaced relationship with the upper edges of the side walls of said conduit for engaging the outer face of the top panel of a package with which the device has been associated.

LYSLE B. GRAY.

REFERENCES CITED

The following references are of record in the file of this patent:

UNITED STATES PATENTS

| Number | Name | Date |
| --- | --- | --- |
| 2,092,983 | Milward | Sept. 14, 1937 |
| 2,107,654 | Vail | Feb. 8, 1939 |
| 2,282,150 | Andary | May 5, 1942 |
| 2,318,812 | Spilo | May 11, 1943 |